United States Patent
Jin et al.

(10) Patent No.: US 12,314,198 B1
(45) Date of Patent: May 27, 2025

(54) SYNCHRONIZATION OPTIMIZATION METHOD FOR EtherCAT MASTER SLAVES

(71) Applicant: CHINA JILIANG UNIVERSITY, Zhejiang (CN)

(72) Inventors: Yinglian Jin, Zhejiang (CN); Binrui Wang, Zhejiang (CN); Haochun Wang, Zhejiang (CN); Kun Zhou, Zhejiang (CN); Shanqiang Wu, Zhejiang (CN); Wei Song, Zhejiang (CN); Tao Zheng, Zhejiang (CN); Xianlei Chen, Zhejiang (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/800,161

(22) Filed: Aug. 12, 2024

Related U.S. Application Data

(63) Continuation of application No. PCT/CN2024/103186, filed on Jul. 2, 2024.

(30) Foreign Application Priority Data

Apr. 26, 2024 (CN) .......................... 202410511726.5

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .................................................... H04L 12/4135
See application file for complete search history.

(56) References Cited

U.S. PATENT DOCUMENTS

| 2003/0058890 | A1* | 3/2003 | Ritchie, Jr. | H04L 65/70 |
| | | | | 375/E7.002 |
| 2018/0046265 | A1* | 2/2018 | Cook | G06F 3/0346 |
| 2018/0091245 | A1* | 3/2018 | Leyrer | H04J 3/0655 |

* cited by examiner

*Primary Examiner* — Henry Tsai
*Assistant Examiner* — Juanito C Borromeo

(57) ABSTRACT

A synchronization optimization method for EtherCAT master slaves is provided. By capturing a time when a master sends a data frame, a time when receives, and a time when a reference slave receives the data frame, a transmission delay is calculated. A compensated transmission delay is obtained. A time taken for a data frame to leave a parent port and return to the same parent port, a transmission delay, a clock offset, and a clock drift are calculated. The clock drift is compensated. A new clock offset is obtained by subtracting the compensated clock drift from the clock offset and written into the non-reference slave for compensation to complete a synchronization optimization. The present application reduces the clock drift and enables the master to compensate for the clock drift of each slave more rapidly.

9 Claims, 3 Drawing Sheets

SYNCHRONIZATION OPTIMIZATION METHOD FOR EtherCAT MASTER SLAVES

CROSS-REFERENCE TO RELATED APPLICATIONS

The present application is a Continuation Application of PCT Application No. PCT/CN2024/103186, filed on Jul. 2, 2024, which claims the priority of Chinese Patent Application No. 202410511726.5, filed on Apr. 26, 2024, the entire contents of which are hereby incorporated by reference.

TECHNICAL FIELD

The present application relates to the technical field of industrial automation, specifically to a synchronization optimization method for EtherCAT master-slaves.

BACKGROUND

EtherCAT (Ethernet for Control Automation Technology) is a high-performance real-time Ethernet communication protocol designed for real-time control and automation applications. It aims to provide a low-latency, a high-precision, and a high-reliability in communication, to meet the stringent real-time performance requirements of the industrial automation field. Due to a unique "Distributed Clock Synchronization" technology, EtherCAT's enables an entire master-slave system to achieve a synchronization accuracy at the nanosecond level. In multi-axis control systems for robots, an ability to achieve synchronized control of each motor has a significant impact on control precision. EtherCAT employs a clock synchronization mechanism known as DC (Distributed Clocks), which allows for an achievement of highly synchronized clocks among various slave devices on the EtherCAT network. Clock synchronization is a foundation that ensures the coordinated operation between a controller and various execution terminals, as well as among the execution terminals themselves. A core idea of DC is to achieve a high-precision synchronization throughout the entire system by synchronizing the local clocks of the slave devices within the EtherCAT communication cycle. During system operation, due to factors such as a reference clock and clock sources used by other slave clocks, there exists a certain degree of drift in their timing cycles, leading to asynchronous clock operations and clock drift among slaves. This phenomenon, known as clock drift, can significantly impact system performance. After calculating a clock drift of non-reference slaves using traditional methods, only a sign of the clock drift is considered, and a clock speed is adjusted by judging a positive or negative value of the clock drift. In a clock drift compensation method, a magnitude of the compensation is not taken into account during a compensation process for clock drift, only a direction of compensation is considered, which may reduce an effectiveness of drift compensation. Even if a master periodically sends clock drift compensation data frame to each slave, considerable synchronization errors can still be observed.

In summary, existing clock drift compensation techniques have technical problem where there is a significant amount of clock drift among the slaves and the master is unable to rapidly compensate for the clock drift of each individual slave.

SUMMARY

In response to the deficiencies in the existing technology mentioned above, the present application provides a synchronization optimization method for EtherCAT master-slaves, aiming to reduce clock drift of each slave and enable the master to compensate for the clock drift of each slave more rapidly.

The present application provides a synchronization optimization method for EtherCAT master-slaves, which includes steps of:

Capturing a time when a master sends a data frame and a time when the master receives the data frame, capturing a time when a reference slave receives the data frame, calculating a transmission delay between the master and the reference slave, and obtaining a compensated transmission delay between the master and the reference slave;

Calculating a time taken for the data frame to leave a parent port of a non-reference slave and return to the parent port of the non-reference slave, calculating a transmission delay, a clock offset, and a clock drift for the non-reference slave;

Compensating for the clock drift by adopting a double exponential smoothing algorithm, subtracting the compensated clock drift from the clock offset and obtaining a new clock offset, writing the new clock offset into the non-reference slave for compensation to complete a synchronization optimization.

Optionally, before the step of capturing a time when a master sends a data frame and a time when the master receives the data frame, further includes: by sending the data frame through the master, capturing a number of slaves, a first port of each slave that receives the data frame, and active ports of each slaves, determining a parent and a parent port of the non-reference slave based on the number of connected slaves and a port transmission sequence.

Optionally, the step of obtaining a compensated transmission delay between the master and the reference slave includes: obtaining the compensated transmission delay between the master and the reference slave by adopting an exponential moving average algorithm.

Optionally, before the step of calculating a transmission delay for the non-reference slave, further includes: when a number of slaves connected to a non-reference slave i is greater than 1, calculating a transmission time for a subsequent slave of the non-reference slave i.

Optionally, before the step of calculating a clock offset for the non-reference slave, further includes: calculating a clock offset for a reference slave clock.

Optionally, the step of compensating for the clock drift by adopting a double exponential smoothing algorithm includes:

initializing: a level $L_1=\Delta t_1$, a trend $T_1=\Delta t_2-\Delta t_1$, wherein $\Delta t_1$ is a clock drift calculated for a first time, and $\Delta t_2$ is a clock drift calculated for a second time;

updating the level: $L_k=\alpha\square\Delta t_k+(1-\alpha)\square(L_{k-1}+T_{k-1})$;

updating the trend: $T_k=\beta\square(L_k-L_{k-1})+(1-\beta)\square T_{k-1}$;

a compensated clock drift: $\Delta Ct_{i,k}=L_k+T_k$;

Wherein, $L_k$ is a level at the kth update; $T_k$ is a trend at the kth update; $\Delta Ct_{i,k}$ is a clock drift of the non-reference slave i at the kth compensation; $\alpha$ and $\beta$ are smoothing factors.

Optionally, the step of calculating a transmission delay between the master and the reference slave includes:

$$td_m = \frac{(t_{m,1} - t_{m,0}) - (t_{r,1} - t_{r,0})}{2};$$

wherein, $td_m$ is the transmission delay between the master and the reference slave, $t_{m,0}$ is the time when the master sends the data frame, $t_{m,1}$ is the time when the master receives the returned data frame, $t_{r,0}$ is a time when the data frame arrives at a port 0 of the reference slave, and $t_{r,1}$ is a time when the data frame arrives at a port 1 of the reference slave.

Optionally, wherein the step of obtaining the compensated transmission delay between the master and the reference slave by adopting an exponential moving average algorithm includes:

$$TD_{m,k} = \alpha \Box td_{m,k} + (1-\alpha)TD_{m,k-1};$$

wherein, $TD_{m,k}$ is a transmission delay between the master and the reference slave after the kth compensation, a is a smoothing factor with a value range between (0,1), $td_{m,k}$ is an uncompensated transmission delay between the master and the reference slave, and $TD_{m,k-1}$ is a transmission delay obtained from a previous compensation.

Optionally, wherein the step of calculating a time taken for the data frame to leave a parent port of a non-reference slave and return to the parent port of the non-reference slave includes:

$$R_{i,parent} = t_{i,parent} - pt_{i,parent};$$

wherein, $R_{i,parent}$ represents the time taken for the data frame to leave a parent slave of a non-reference slave i and return to the parent port of the non-reference slave i, $t_{i,parent}$ is a time when the parent port of the non-reference slave i receives the data frame, and $pt_{i,parent}$ is a time when a previous active port receives the data frame.

Optionally, wherein the step of calculating a transmission delay for the non-reference slave includes:

$$TD_i = \frac{1}{2} \times (R_{i,parent} - D_{i,follow}) + TD_{parent};$$

wherein, $TD_i$ is a transmission delay for the non-reference slave i, $TD_{parent}$ is a transmission delay of a parent slave of the non-reference slave i, $D_{i,follow}$ is a transmission time for the subsequent slave of the non-reference slave i;

$D_{i,follow} = pt_{i,first} - t_{i,first}$, $t_{i,first}$ is a time when a first port of the non-reference slave i that receives data receives the data frame, and $pt_{i,first}$ is a time when a previous active port receives the data frame.

Compared to the existing technologies, beneficial effects of the present application are as follows:

The present application provides a synchronization optimization method for EtherCAT master-slaves. By capturing the time when the master sends the data frame and the time when the master receives the data frame, capturing the time when the reference slave receives the data frame, the transmission delay between the master and the reference slave is calculated. By adopting the exponential moving average algorithm, the compensated transmission delay between the master and the reference slave is obtained. The time taken for the data frame to leave the parent port of the non-reference slave and return to the parent port of the non-reference slave is calculated. The transmission delay, the clock offset, and the clock drift for the non-reference slave are calculated. By adopting a double exponential smoothing algorithm, the clock drift is compensated, and the new clock offset is obtained by subtracting the compensated clock drift from the clock offset. The new clock offset is written into the non-reference slave for compensation to complete a synchronization optimization. Thus, the clock drift of each slave is reduced, and the master can compensate for the clock drift of each slave more rapidly.

BRIEF DESCRIPTION OF DRAWINGS

The accompanying drawings described here are provided to further understand the present application and constitute a part of the present application. The illustrative embodiments and descriptions of the present application are used to explain the present application and do not constitute undue limitations. Some specific embodiments of the present application will be described in detail in an exemplary and non-limiting manner with reference to the accompanying drawings. Same reference numerals in the drawings indicate the same or similar components or parts. Those skilled in the art should understand that these drawings may not necessarily be drawn to scale. In the drawings.

DESCRIPTION OF EMBODIMENTS

In order to enable those skilled in the art to better understand the present application, the technical solutions in the embodiments of the present application will be described clearly and completely in conjunction with the drawings in the embodiments of the present application. Obviously, described embodiments are merely embodiments which are a part of the present application, but are not all of the embodiments. Based on the embodiments of the present application, all other embodiments obtained by those of ordinary skill in the art without creative labor should fall within the scope of protection of the present application.

Figure 1:
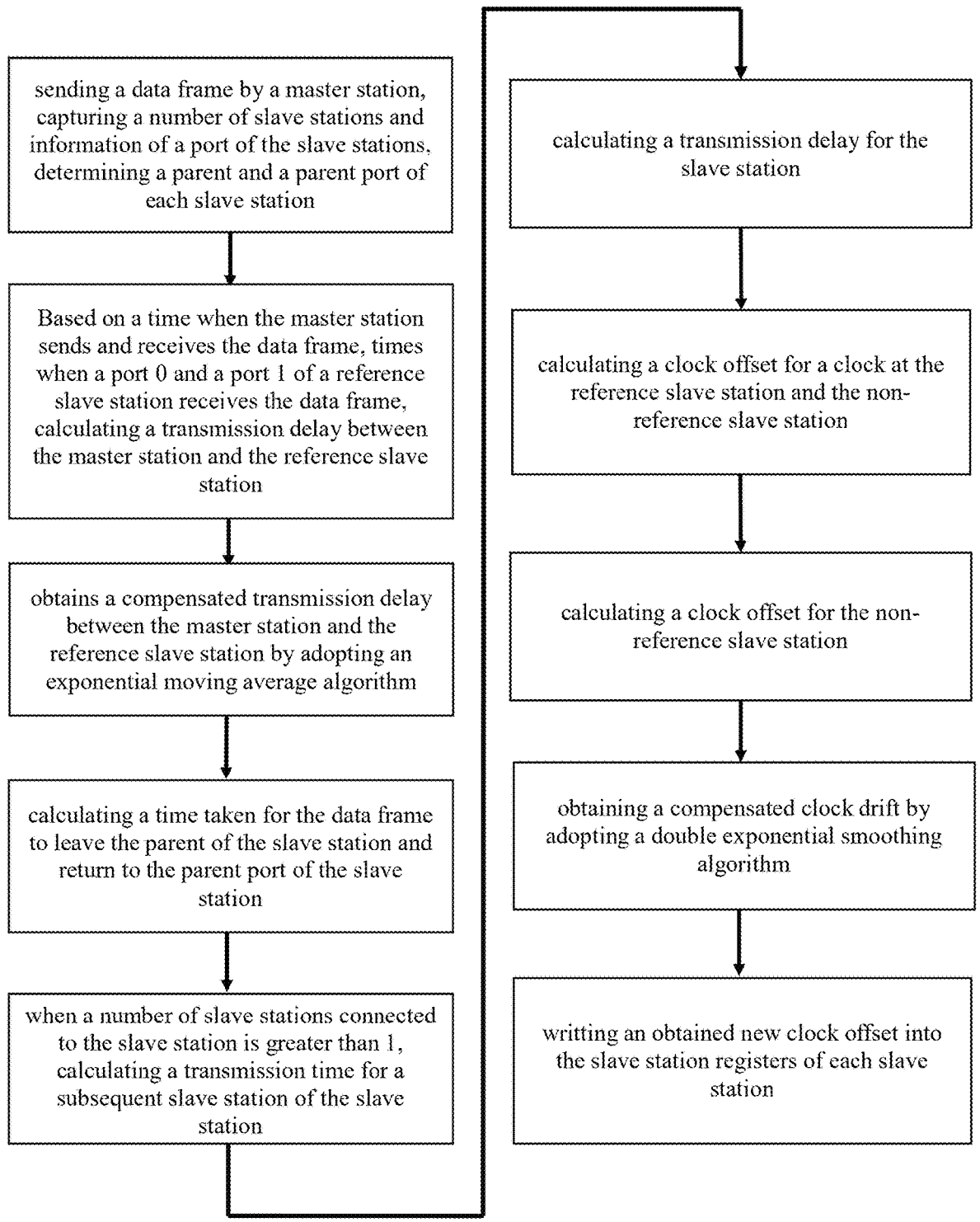
FIG. 1 shows a schematic flowchart of a synchronization optimization method for EtherCAT master-slaves according to an embodiment of the present application.
Figure 2:
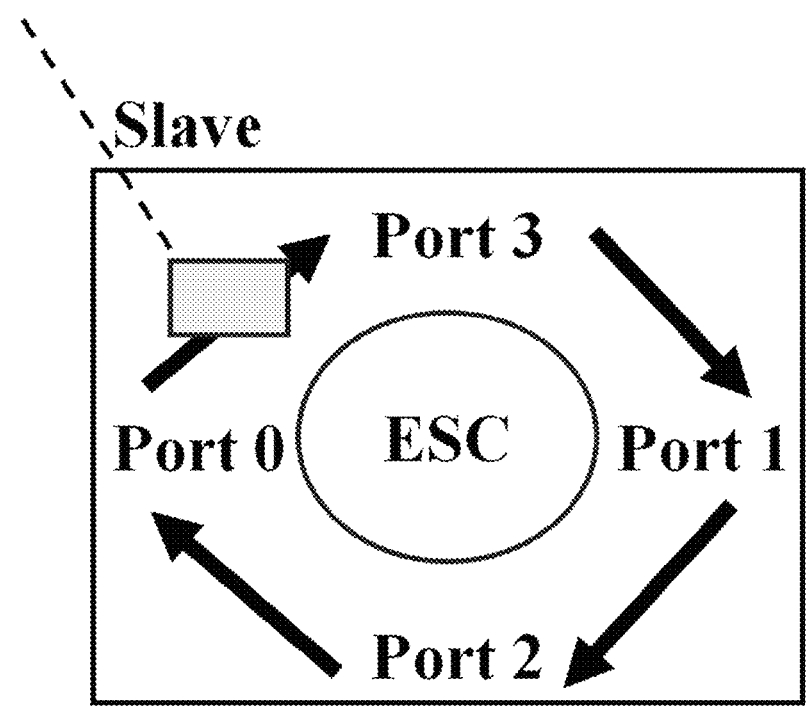
FIG. 2 is a schematic diagram showing a port transmission sequence on an EtherCAT slave chip according to an embodiment of the present application.
Figure 3:
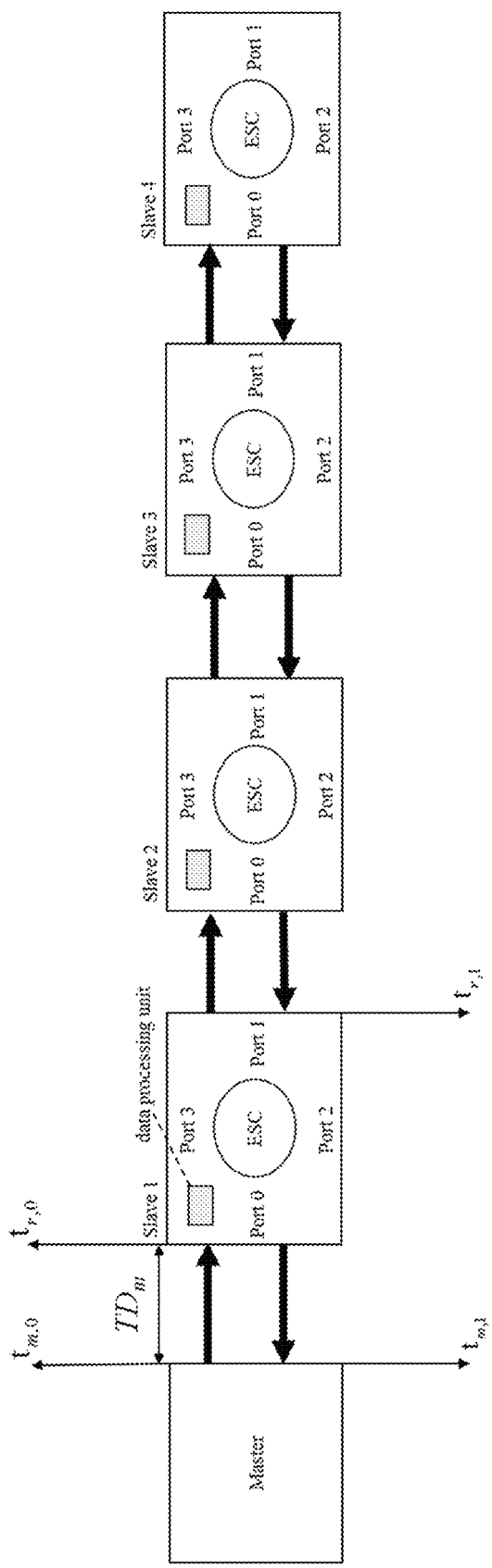
FIG. 3 is an example diagram of calculating a transmission delay between a master and a reference slave according to an embodiment of the present application.

Referring to FIGS. 1-3, the embodiment of the present application provides a synchronization optimization method for EtherCAT master-slaves, which includes the following steps.

Capturing a time when a master sends a data frame and a time when the master receives the data frame, capturing a time when a reference slave receives the data frame, calculating a transmission delay between the master and the reference slave, and obtaining a compensated transmission delay between the master and the reference slave by adopting an exponential moving average algorithm;

Calculating a time taken for the data frame to leave a parent port of a non-reference slave and return to the parent port of the non-reference slave, calculating a transmission delay, a clock offset, and a clock drift for the non-reference slave;

Compensating for the clock drift by adopting a Double Exponential Smoothing (DES) algorithm, subtracting the compensated clock drift from the clock offset and obtaining a new clock offset, writing the new clock offset into the non-reference slave for compensation to complete a synchronization optimization.

It should be noted that in the embodiment, by capturing the time when the master sends the data frame and the time when the master receives the data frame, capturing the time when a reference slave receives the data frame, the transmission delay between the master and the reference slave is calculated. By adopting the exponential moving average algorithm, the compensated transmission delay between the master and the reference slave is obtained. Then, the time taken for a data frame to leave a parent port of a non-reference slave and return to the parent port of the non-reference slave is calculated. The transmission delay, the clock offset, and the clock drift for the non-reference slave are calculated. By adopting a double exponential smoothing algorithm, the clock drift is compensated, and the new clock offset is obtained by subtracting the compensated clock drift from the clock offset. The new clock offset is written into the non-reference slave for compensation to complete a synchronization optimization. Thus, the clock drift of each slave is reduced, and the master can compensate for the clock drift of each slave more rapidly. It is understandable that in the embodiment, by adopting the double exponential smoothing algorithm to predict and compensate for clock drift, while taking into account a magnitude and a sign of the drift, an effectiveness of drift compensation is maximized, resulting in reduced clock drift of each slave. Additionally, due to jitter in the clock of the master, the transmission delay becomes uncertain, and the transmission delay itself may also fluctuate, in the embodiment, an exponential moving average (EMA) algorithm filtering method is adopted to obtain the transmission delay, thereby determining the determination of an accurate transmission latency.

It is also necessary to clarify that, the synchronization optimization method for EtherCAT master-slaves provided in the embodiment can include the following steps when specifically implemented.

Step 1, capturing a number of slaves, a first port of each slave that receives the data frame, and active ports of each slaves, by sending the data frame through a master. Based on the number of connected slaves and a port transmission sequence "0-3-1-2" on a slave chip shown in FIG. 2, a parent and a parent port of the non-reference slave are determined.

Step 2, capturing a time when the master sends the data frame and a time when the master receives the data frame, capturing times when a port 0 and a port 1 of a reference slave receives the data frame, calculating a transmission delay $td_m$, between the master and the reference slave using formula (1) as shown below.

$$td_m = \frac{(t_{m,1} - t_{m,0}) - (t_{r,1} - t_{r,0})}{2} \qquad (1)$$

Wherein, $t_{m,0}$ is the time when the master sends the data frame, $t_{m,1}$ is the time when the master receives the returned data frame, $t_{r,0}$ is the time when the data frame arrives at the port 0 of the reference slave, and $t_{r,1}$ is the time when the data frame arrives at the port 1 of the reference slave.

Step 3, due to jitter in a clock at the master, which can lead to uncertainty in transmission delays, and the transmission delay itself may also vary. To address the problem, the embodiment obtains a compensated transmission delay between the master and the reference slave by adopting the exponential moving average algorithm, as illustrated in FIG. 3, and stores the compensated transmission delay in registers 0x928 to 0x92B. A calculation formula (2) is expressed as follows.

$$TD_{m,k} = \alpha \Box td_{m,k} + (1-\alpha)TD_{m,k-1} \qquad (2)$$

Wherein, $TD_{m,k}$ represents a transmission delay between the master and the reference slave after the kth compensation, $\alpha$ is a smoothing factor with a value range between (0,1), $td_{m,k}$ is an uncompensated transmission delay between the master and the reference slave, and $TD_{m,k-1}$ is a transmission delay obtained from a previous compensation.

Step 4, Calculating a time taken for the data frame to leave a parent of a slave i (non-reference slave) and return to a parent port of the slave i. A calculation formula is shown in formula (3).

$$R_{i,parent} = t_{i,parent} - pt_{i,parent} \qquad (3)$$

Wherein, $R_{i,parent}$ represents the time taken for the data frame to leave a parent of a slave i and return to a parent port of the slave i, $t_{i,parent}$ is a time when the parent port of the slave i receives the data frame, and $pt_{i,parent}$ is a time when a previous active port receives the data frame.

Furthermore, in a certain embodiment, the method also includes Step 5: when a number of slaves connected to the slave i is greater than 1, calculating a transmission time for a subsequent slave of the slave i. A formula (4) for calculating the transmission time for the subsequent slave is as follows.

$$D_{i,follow} = pt_{i,first} - t_{i,first} \qquad (4)$$

Wherein, $D_{i,follow}$ is the transmission time for the subsequent slave of the slave i, $t_{i,first}$ is a time when a first port of the slave i that receives data receives the data frame, and $pt_{i,first}$ is a time when a previous active port receives the data frame.

Step 6, calculating a transmission delay $TD_i$ for the non-reference slave i, and writing the calculated transmission delay into registers 0x928 to 0x92B. A formula (5) is expressed as follows.

$$TD_i = \frac{1}{2} \times (R_{i,parent} - D_{i,follow}) + TD_{parent} \qquad (5)$$

Wherein, $TD_i$ is the transmission delay for the slave i, $TD_{parent}$ is a transmission delay of a parent slave of the slave i.

Furthermore, in a certain embodiment, the method also includes Step 7: calculating a clock offset for a clock at the reference slave. When the master sends one data frame, upon reaching a data processing unit of each slave, the slave will lock the time in a register.

During a synchronization process between the master and the slaves, the master needs to synchronize with the reference clock. Since a system time $system_m$ at which the master sends the data frame serves as a global time, there exists a clock offset $offset_r$ and a transmission delay $TD_{m,k}$ between the master and the reference clock (the jitter in the master clock, the compensated transmission delay $TD_{m,k}$ is obtained). The clock offset $offset_r$ between the master and the reference clock is then written into the slave registers 0x920 to 0x927. A calculation formula is given in (6).

$$offset_r = system_m - T_{r,recv} - TD_{m,k} \qquad (6)$$

Step 8, calculating a clock offset for the non-reference slave. When the data frame arrives at the data processing unit of the slave i, a local clock time local_time of the slave i is denoted as $T_{i,recv}$, and the transmission delay from the reference clock slave to the slave i is denoted as $TD_i$.

Specifically, a reception time $T_{i,recv}$ of the data frame arriving at the data processing unit is obtained by reading the slave registers 0x918 to 0x91F. The clock offset $offset_r$ between the slave and the reference clock is calculated and written into the slave registers 0x920 to 0x927. A calculation formula (7) is expressed as follows.

$$offset_i = system_m - TD_{m,k} - T_{i,recv} - TD_i \qquad (7).$$

Step 9, calculating a clock drift of the non-reference slave. A formula (8) for calculating the clock drift Δt of the slave i is:

$$\Delta t = \text{system\_time}_i - (\text{reference\_time}_i + TD_i) \quad (8)$$

Wherein, system_time$_i$ represents a system time of a clock at the slave i, and reference_time$_i$ represents a reference time of a clock at the reference slave.

Step 10, obtaining a compensated clock drift $\Delta Ct_{i,k}$ by adopting a double exponential smoothing algorithm, after calculating the clock drift of the non-reference slave.

In an optional example, the calculation steps are as follows.

Initializing: a level $L_1 = \Delta t_1$, a trend $T_1 = \Delta t_2 - \Delta t_1$, wherein $\Delta t_1$ is a clock drift calculated for a first time using the formula (8), and $\Delta t_2$ is a clock drift calculated for a second time.

$$\text{Forecasting and updating the level: } L_k = \alpha \square \Delta t_k + (1-\alpha)\square(L_{k-1}+T_{k-1}) \quad (9)$$

$$\text{Updating the trend: } T_k = \beta\square(L_k - L_{k-1}) + (1-\beta)T_{k-1} \quad (10)$$

$$\text{A compensated clock drift: } \Delta Ct_{i,k} = L_k + T_k \quad (11)$$

Wherein, $L_k$ is a level at the kth update; $T_k$ is a trend at the kth update; $\Delta Ct_{i,k}$ is a clock drift of the non-reference slave i at the kth compensation; α and β are smoothing factors, with values ranging from 0 to 1.

Step 11, after obtaining the compensated clock drift, subtracting the compensated clock drift from the clock offset offset and obtaining a new clock offset new_offset. A calculation formula is as shown in Formula (11). Finally, the new clock offset new_offset is written into the slave registers 0x920 to 0x927 for compensation.

$$\text{new\_offset}_i = \text{offset}_i - \Delta Ct_{i,k} \quad (12)$$

It is important to point out that the above embodiments are merely illustrative of the preferred specific implementations of the present application. The scope of protection of the present application is not limited to these embodiments. Any variations or substitutions that can be easily conceived by those skilled in the art within the technical scope disclosed by the present application shall be deemed to fall within the scope of protection of the present application. The scope of protection of the present application shall be determined by the scope of protection defined in the claims.

The invention claimed is:

1. A synchronization optimization method for EtherCAT master-slaves, comprising steps of:
   capturing a time when a master sends a data frame and a time when the master receives the data frame, capturing a time when a reference slave receives the data frame, calculating a transmission delay between the master and the reference slave, and obtaining a compensated transmission delay between the master and the reference slave;
   calculating a time taken for the data frame to leave a parent port of a non-reference slave and return to the parent port of the non-reference slave, calculating a transmission delay, a clock offset, and a clock drift for the non-reference slave;
   compensating for the clock drift by adopting a double exponential smoothing algorithm, subtracting the compensated clock drift from the clock offset and obtaining a new clock offset, writing the new clock offset into the non-reference slave for compensation to complete a synchronization optimization; and
   before the step of capturing a time when a master sends a data frame and a time when the master receives the data frame, further comprising: by sending the data frame through the master, capturing a number of slaves, a first port of each slave that receives the data frame, and active ports of each slaves, determining a parent and a parent port of the non-reference slave based on the number of connected slaves and a port transmission sequence.

2. The method of claim 1, wherein the step of obtaining a compensated transmission delay between the master and the reference slave comprises: obtaining the compensated transmission delay between the master and the reference slave by adopting an exponential moving average algorithm.

3. A synchronization optimization method for EtherCAT master-slaves, comprising steps of:
   capturing a time when a master sends a data frame and a time when the master receives the data frame, capturing a time when a reference slave receives the data frame, calculating a transmission delay between the master and the reference slave, and obtaining a compensated transmission delay between the master and the reference slave;
   calculating a time taken for the data frame to leave a parent port of a non-reference slave and return to the parent port of the non-reference slave, calculating a transmission delay, a clock offset, and a clock drift for the non-reference slave;
   compensating for the clock drift by adopting a double exponential smoothing algorithm, subtracting the compensated clock drift from the clock offset and obtaining a new clock offset, writing the new clock offset into the non-reference slave for compensation to complete a synchronization optimization; and
   before the step of calculating a transmission delay for the non-reference slave, further comprising: when a number of slaves connected to a non-reference slave i is greater than 1, calculating a transmission time for a subsequent slave of the non-reference slave i.

4. A synchronization optimization method for EtherCAT master-slaves, comprising steps of:
   capturing a time when a master sends a data frame and a time when the master receives the data frame, capturing a time when a reference slave receives the data frame, calculating a transmission delay between the master and the reference slave, and obtaining a compensated transmission delay between the master and the reference slave;
   calculating a time taken for the data frame to leave a parent port of a non-reference slave and return to the parent port of the non-reference slave, calculating a transmission delay, a clock offset, and a clock drift for the non-reference slave;
   compensating for the clock drift by adopting a double exponential smoothing algorithm, subtracting the compensated clock drift from the clock offset and obtaining a new clock offset, writing the new clock offset into the non-reference slave for compensation to complete a synchronization optimization; and
   before the step of calculating a clock offset for the non-reference slave, further comprising: calculating a clock offset for a reference slave clock.

5. The method of claim 1, wherein the step of compensating for the clock drift by adopting a double exponential smoothing algorithm comprises:

initializing: a level $L_1=\Delta t_1$, a trend $T_1=\Delta t_2-\Delta t_1$, wherein $\Delta t_1$ is a clock drift calculated for a first time, and $\Delta t_2$ is a clock drift calculated for a second time;

updating the level: $L_k=\alpha \cdot \Delta t_k+(1-\alpha)\cdot(L_{k-1}+T_{k-1})$;

updating the trend: $T_k=\beta \cdot (L_k-L_{k-1})+(1-\beta)\cdot T_{k-1}$;

a compensated clock drift: $\Delta Ct_{i,k}=L_k+T_k$;

wherein, $L_k$ is a level at the kth update; $T_k$ is a trend at the kth update; $\Delta Ct_{i,k}$ is a compensated clock drift of the non-reference slave i at the kth compensation; $\alpha$ and $\beta$ are smoothing factors, with values ranging from 0 to 1.

6. The method of claim 1, wherein the step of calculating a transmission delay between the master and the reference slave comprises:

$$td_m = \frac{(t_{m,1} - t_{m,0}) - (t_{r,1} - t_{r,0})}{2};$$

wherein, $td_m$ is the transmission delay between the master and the reference slave, $t_{m,0}$ is the time when the master sends the data frame, $t_{m,1}$ is the time when the master receives the returned data frame, $t_{r,0}$ is a time when the data frame arrives at a port 0 of the reference slave, and $t_{r,1}$ is a time when the data frame arrives at a port 1 of the reference slave.

7. The method of claim 1, wherein the step of obtaining the compensated transmission delay between the master and the reference slave by adopting an exponential moving average algorithm comprises:

$TD_{m,k}=\alpha \cdot td_{m,k}+(1-\alpha)TD_{m,k-1}$;

wherein, $TD_{m,k}$ is a transmission delay between the master and the reference slave at the kth compensation, $\alpha$ is a smoothing factor with a value range between (0,1), $td_{m,k}$ is an uncompensated transmission delay between the master and the reference slave, and $TD_{m,k-1}$ is a transmission delay obtained from the previous compensation.

8. The method of claim 1, wherein the step of calculating a time taken for the data frame to leave a parent port of a non-reference slave and return to the parent port of the non-reference slave comprises:

$R_{i,parent}=t_{i,parent}-pt_{i,parent}$;

wherein, $R_{i,parent}$ is the time taken for the data frame to leave a parent slave of a non-reference slave i and return to the parent port of the non-reference slave i, $t_{i,parent}$ is a time when the parent port of the non-reference slave i receives the data frame, and $pt_{i,parent}$ is a time when a previous active port receives the data frame.

9. The method of claim 8, wherein the step of calculating a transmission delay for the non-reference slave comprises:

$$TD_i = \frac{1}{2} \times (R_{i,parent} - D_{i,follow}) + TD_{parent};$$

wherein, $TD_i$ is a transmission delay for the non-reference slave i, $TD_{parent}$ is a transmission delay of a parent slave of the non-reference slave i, $D_{i,follow}$ is a transmission time for a subsequent slave of the non-reference slave i;

$D_{i,follow}=pt_{i,first}-t_{i,first}$, $t_{i,first}$ is a time when a first port of the non-reference slave i that receives data receives the data frame, and $pt_{i,first}$ is a time when a previous active port receives the data frame.

* * * * *